United States Patent
Ho

(10) Patent No.: US 8,531,823 B2
(45) Date of Patent: Sep. 10, 2013

(54) ELECTRONIC DEVICE

(75) Inventor: Chia-Ju Ho, Taipei (TW)

(73) Assignee: Inventec Corporation, Taipei (TW)

( * ) Notice: Subject to any disclaimer, the term of this patent is extended or adjusted under 35 U.S.C. 154(b) by 245 days.

(21) Appl. No.: 13/176,110

(22) Filed: Jul. 5, 2011

(65) Prior Publication Data

US 2012/0287558 A1 Nov. 15, 2012

(30) Foreign Application Priority Data

May 9, 2011 (TW) .............................. 100116173 A

(51) Int. Cl.
*H05K 7/00* (2006.01)

(52) U.S. Cl.
USPC .................. 361/679.01; 361/679.55; 429/97; 429/100

(58) Field of Classification Search
USPC ................. 429/97, 100; 361/679.01, 679.02, 361/679.43, 679.55, 679.57, 679.58; 455/575.1, 455/575.3, 572
See application file for complete search history.

(56) References Cited

U.S. PATENT DOCUMENTS

| | | | | |
|---|---|---|---|---|
| 6,606,241 B2* | 8/2003 | Moore | ...................... | 361/679.58 |
| 6,724,616 B2* | 4/2004 | Kuo et al. | ................. | 361/679.02 |
| 7,333,324 B2* | 2/2008 | DeLuga | .................... | 361/679.55 |
| 7,885,064 B2* | 2/2011 | Chen et al. | ................ | 361/679.58 |
| 8,367,238 B2* | 2/2013 | Chang | ............................ | 429/100 |
| 8,399,117 B2* | 3/2013 | Hu et al. | .......................... | 429/96 |
| 8,422,209 B2* | 4/2013 | Cheng et al. | ............. | 361/679.01 |
| 2012/0135287 A1* | 5/2012 | Lai | ................................. | 429/100 |

FOREIGN PATENT DOCUMENTS

TW  I290671  12/2007

* cited by examiner

*Primary Examiner* — Hoa C Nguyen
*Assistant Examiner* — Dimary Lopez
(74) *Attorney, Agent, or Firm* — CKC & Partners Co., Ltd.

(57) ABSTRACT

An electronic device including a housing, a detachable member, and a latch is provided. The detachable member is assembled to the housing and has a position limiting unit with a guiding surface and a limiting surface. The latch is movably disposed in the housing between a first and a second positions for locking or unlocking to the detachable member. The latch has an elastic unit, and the position limiting unit is on a moving path of the latch. When the latch moves from a first position toward a second position, the elastic unit moves along the guiding surface to the limiting surface and is position-limited at the second position.

8 Claims, 5 Drawing Sheets

ELECTRONIC DEVICE

CROSS-REFERENCE TO RELATED APPLICATION

This application claims the priority benefit of Taiwan application serial no. 100116173, filed on May 9, 2011. The entirety of the above-mentioned patent application is hereby incorporated by reference herein and made a part of this specification.

BACKGROUND OF THE INVENTION

1. Field of the Invention

The invention relates to a latch structure. Particularly, the invention relates to a latch structure of an electronic device.

2. Description of Related Art

Along with development of technology, notebook computers are widely used due to its features of light, thin and easy to carry. The notebook computer is generally configured with a detachable battery to facilitate a user to selectively assemble/disassemble the battery for replacement and charging, etc.

In the existing technique, regarding a structure that combines the battery and the notebook computer, a sliding knob is disposed on a battery slot of the notebook computer to facilitate pushing an engaging member engaged to the battery, so as to achieve an effect of assembling/disassembling the battery. However, according to such design, a plurality of complicated members has to be fabricated on a housing of the notebook computer to achieve the effect of the above sliding knob, which is a costly design, and when the user is about to disassemble/assemble the battery, the user has to use both hands to push the engaging member to disassemble or assemble the battery, which is inconvenient in utilization.

SUMMARY OF THE INVENTION

The invention is directed to an electronic device, in which a detachable member is capable of being disassembled/assembled by a single hand.

The invention provides an electronic device including a housing, a detachable member, and a latch. The detachable member is assembled to the housing and has a position limiting unit. The position limiting unit has a guiding surface and a limiting surface. The latch is movably disposed in the housing between a first position and a second position. When the latch is located at the first position, the latch is engaged to the detachable member, and when the latch is located at the second position, the engagement between the latch and the detachable member is released. The latch has an elastic unit, and the position limiting unit is located on a moving path of the latch. When the latch moves from the first position towards the second position, the elastic unit moves along the guiding surface to the limiting surface and is position-limited at the second position.

In an embodiment of the invention, the guiding surface faces to the first position, and the limiting surface faces to the second position.

In an embodiment of the invention, the housing has a track, and the latch includes a body, an elastic arm, a clamp portion and a protrusion portion. The elastic arm extends from the body. The clamp portion is movably connected to the track. The protrusion portion is disposed on the elastic arm and extends towards the detachable member, where the elastic arm and the protrusion portion form the elastic unit.

In an embodiment of the invention, when the latch moves from the first position towards the second position, the guiding surface leans against the protrusion portion, so that the elastic arm produces an elastic deformation to drive the protrusion portion to move along the guiding surface.

In an embodiment of the invention, the electronic device further includes a spring connected between the latch and the housing. When the latch is moved to the second position, the elastic arm is restored from the elastic deformation, and the spring drives the latch to move towards the first position such that the protrusion portion is interfered with the limiting surface.

In an embodiment of the invention, the detachable member has an engaging portion, and the latch has a hook disposed on the body. When the latch is located at the first position, the hook is buckled to the engaging portion to fix the detachable member to the housing.

In an embodiment of the invention, the detachable member is a battery.

In an embodiment of the invention, the detachable member is suitable for moving along a direction, and the direction is perpendicular to a moving direction of the latch.

In an embodiment of the invention, the clamp portion is movably connected to the track for operating along a moving direction of the latch and another direction perpendicular to the moving direction.

According to the above descriptions, in the embodiment of the invention, in collaboration with the elastic unit of the latch and the position limiting unit of the detachable member, during an unlocking process, the latch only lifts a part of the detachable member away from the housing, and the detachable member and the latch are still in an interference state, which facilitates the user to fetch the detachable member by one hand during a next action, so as to improve utilization convenience of the electronic device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
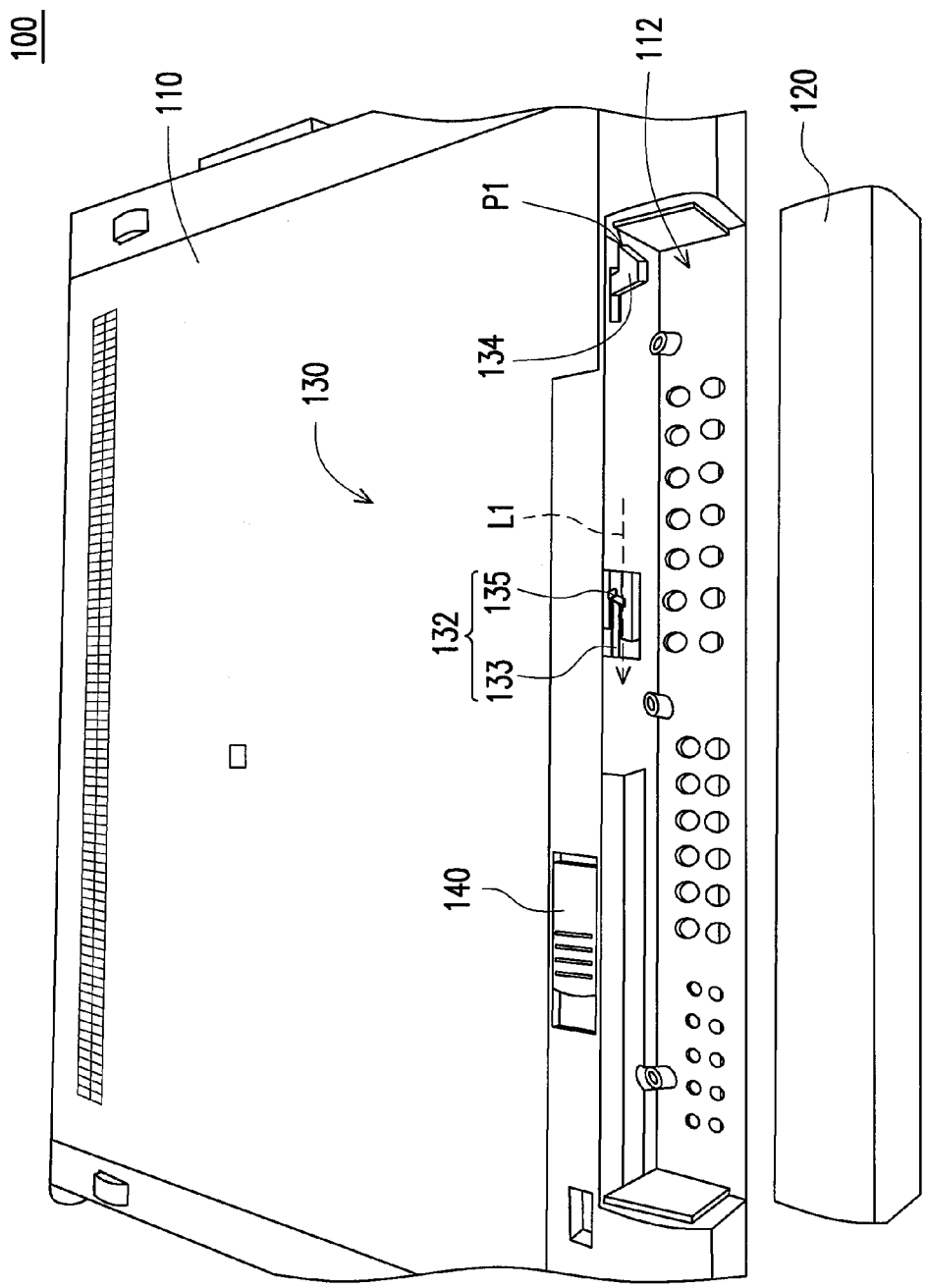
FIG. 1A is a schematic diagram of an electronic device according to an embodiment of the invention.
Figure 1B:
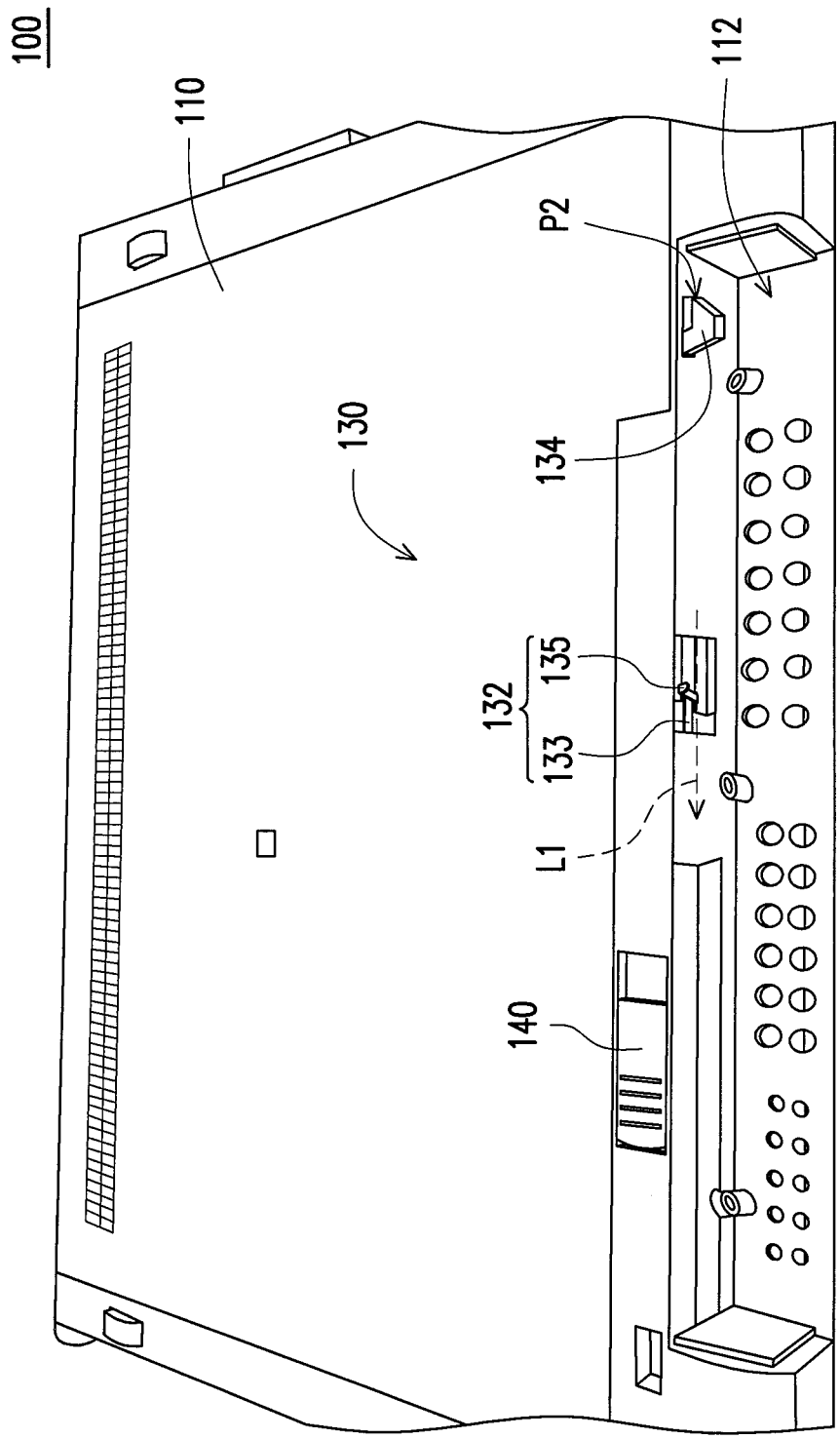
FIG. 1B is a schematic diagram of another state of the electronic device of FIG. 1A.
Figure 2:
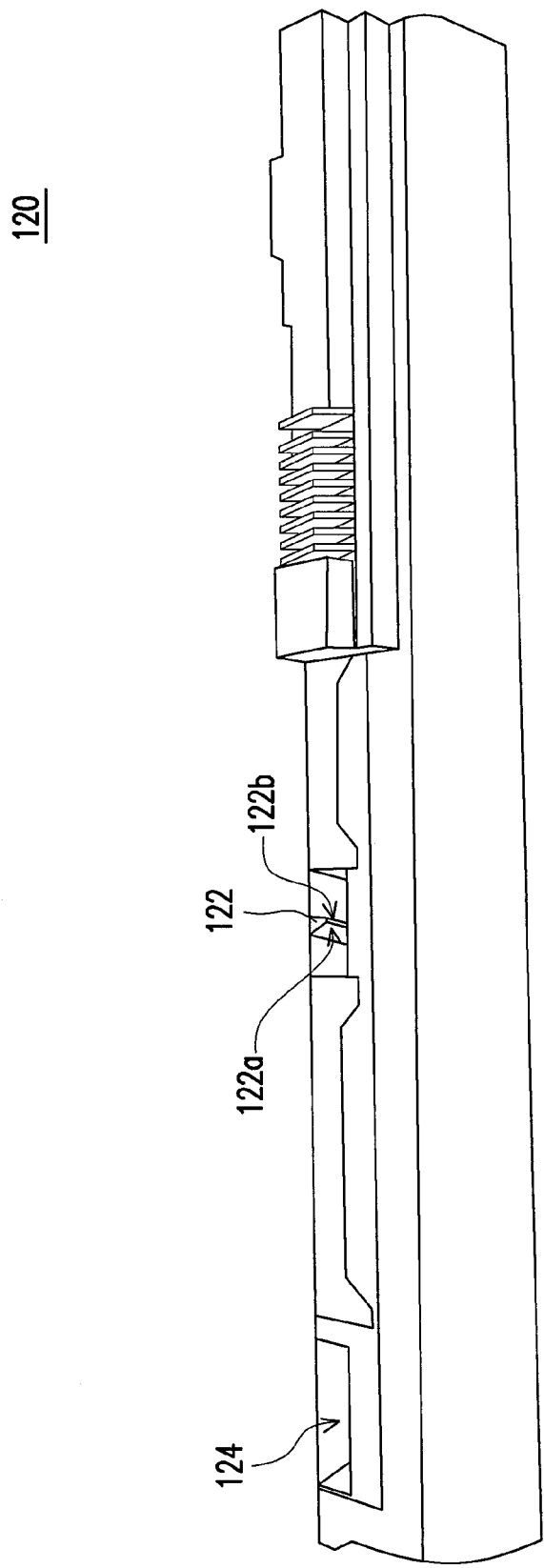
FIG. 2 is a schematic diagram of a detachable member in the electronic device of FIG. 1.

FIG. 1A is a schematic diagram of an electronic device according to an embodiment of the invention. FIG. 1B is a schematic diagram of another state of the electronic device of FIG. 1A. FIG. 2 is a schematic diagram of a detachable member in the electronic device of FIG. 1. Referring to FIG.

1A, FIG. 1B and FIG. 2, in the present embodiment, the electronic device 100 is, for example, a notebook computer, which includes a housing 110, a detachable member 120, a latch 130 and a knob 140. The detachable member 120 is, for example, a battery of the notebook computer, which is assembled in a receiving pit 112 of the housing 110 and has a position limiting unit 122. The latch 130 is movably disposed in the housing 110 between a first position P1 and a second position P2, and the knob 140 is movably disposed on the housing 110 and is connected to the latch 130. The latch 130 has an elastic unit 132 facing to the detachable member 120, where when the user pushes the knob 140 to slide the latch 130 relative to the housing 110, as the position limiting unit 122 is located on a moving path L1 of the elastic unit 132, during a moving process of the latch 130, based on an interaction of the position limiting unit 122 and the elastic unit 132, the latch 130 moves to disassemble/assemble the detachable member 120. Here, the notebook computer and the battery thereof are taken as an exemplary embodiment for description, though the invention is not limited thereto.

Figure 3:
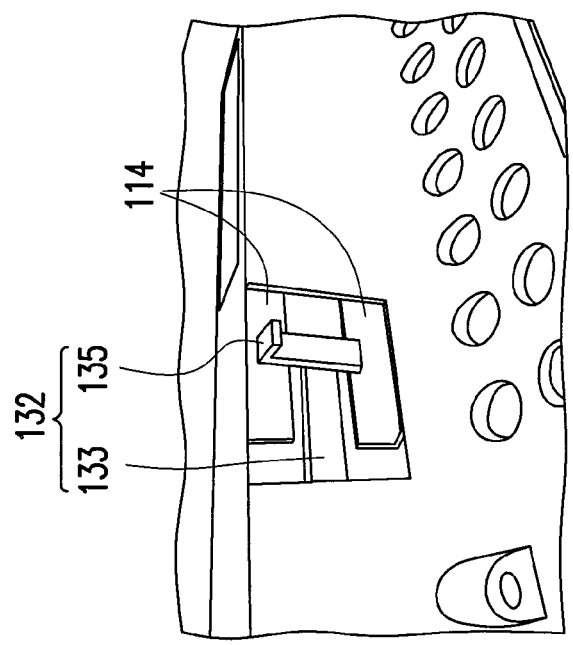
FIG. 3 is a partial enlarged diagram of the electronic device of FIG. 1.

FIG. 3 is a partial enlarged diagram of the electronic device of FIG. 1. Referring to FIG. 1A to FIG. 3, in the present embodiment, when the latch 130 is located at the first position P1, the latch 130 is engaged to the detachable member 120, and when the latch 130 is located at the second position P2, the engagement between the latch 130 and the detachable member 130 is released. Moreover, when the latch 130 moves from the first position P1 towards the second position P2, the elastic unit 132 and the position limiting unit 122 are leaned against to each other. It should be noticed that during a moving process of the elastic unit 132 along the position limiting unit 122, the elastic unit 132 produces an elastic deformation. When the latch 130 is moved to the second position P2, the mutual leaning against state between the elastic unit 132 and the position limiting unit 122 is released, i.e. the elastic unit 132 is restored from an elastic deformation state to an original un-deformation state, and is interfered with the position limiting unit 122, so that the latch 130 stays at the second position P2. In other words, the elastic unit 132 moves along a guiding surface 122a to a limiting surface 122b, and the latch 130 is position-limited at the second position P2.

In this way, after the user drives the latch 130 by a single hand to unlock the detachable member 120, due to the mutual interference between the position limiting unit 122 of the detachable member 120 and the elastic unit 132 of the latch 130, the user can fetch the detachable member 120 from the housing 110 by the single hand. Therefore, it is unnecessary for the user to use both hands to simultaneously pull the latch 130 and hold the detachable member 120, so that the electronic device 100 is convenient in utilization.

Figure 4:
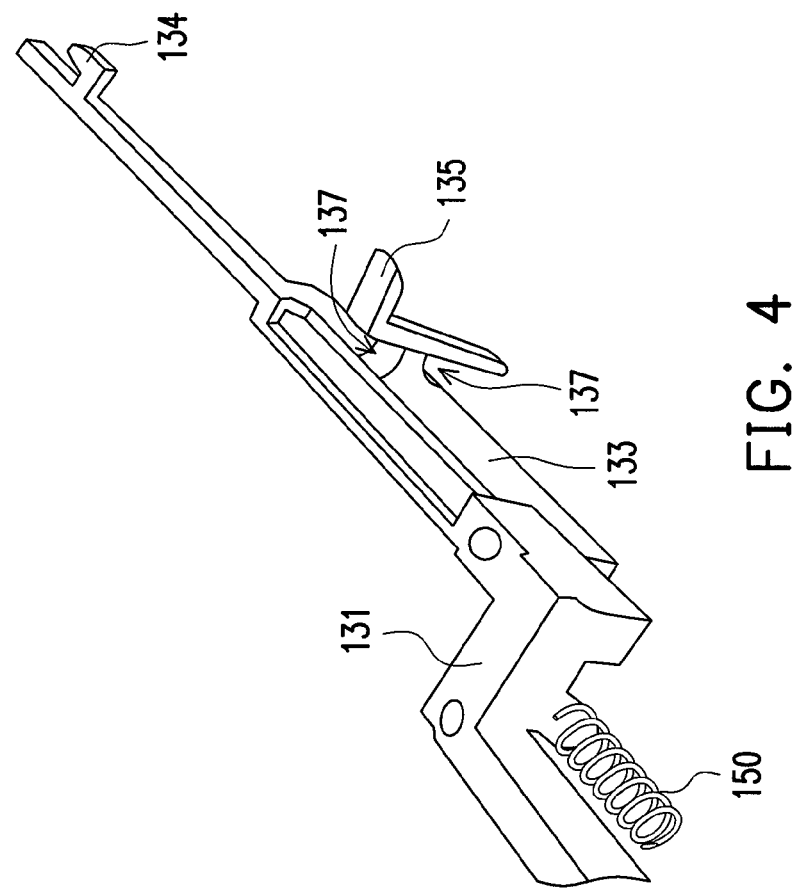
FIG. 4 is a schematic diagram of a latch in the electronic device of FIG. 3.

FIG. 4 is a schematic diagram of the latch in the electronic device of FIG. 3. Referring to FIG. 2 to FIG. 4, in detail, the latch 130 includes a body 131, an elastic arm 133 and a hook 134 extending from the body 131, a protrusion portion 135 disposed on the elastic arm 133 and extending towards the detachable member 120, and a pair of clamp portions 137 located between the protrusion portion 135 and the elastic arm 133, where the elastic arm 133 and the protrusion portion 135 are used to form the elastic unit 132 described above. The hook 134 extending from the body 131 is located away from the elastic arm 133, and protrudes out from the housing 110, and the detachable member 120 has an engaging portion 124 corresponding to the hook 134. When the detachable member 120 is assembled to the housing 110 (i.e. the latch 130 is located at the first position P1), the hook 134 is engaged to the engaging portion 124, and the detachable member 120 is fixed to the housing 110. Moreover, the housing 110 has a track 114, which is a plate-shaped structure located on an inner wall of the receiving pit 112. The clamp portion 137 of the latch 130 is movably clamped on the track 114 for operating along a moving direction of the latch and another direction perpendicular to the moving direction, so that the latch 130 can slide back and forth relative to the housing 110 along the track 114.

Figure 5:
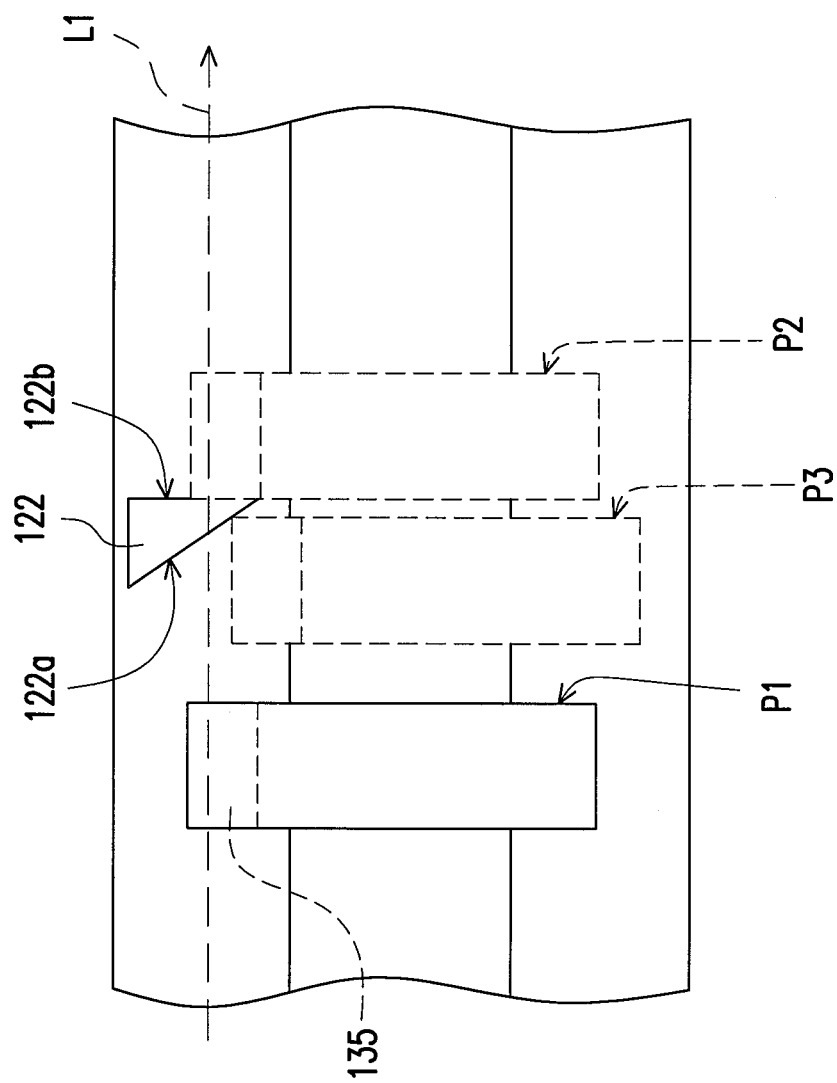
FIG. 5 is a moving schematic diagram of an elastic unit of a latch in the electronic device of FIG. 3 relative to a position limiting unit of a detachable member.

FIG. 5 is a moving schematic diagram of the elastic unit of the latch in the electronic device of FIG. 3 relative to the position limiting unit of the detachable member. Referring to FIG. 3 to FIG. 5, regarding the position limiting unit 122 on the moving path L1, the guiding surface 122a thereof faces to the first position P1, and the limiting surface 122b thereof faces to the second position P2. In the present embodiment, when the latch 130 is moved from the first position P1 towards the second position P2, the protrusion portion 135 leans against the guiding surface 122a. Meanwhile, the position limiting unit 122 leans against the protrusion portion 135 due to a counter force (for example, a third position shown in FIG. 5), so that the elastic arm 133 produces an elastic deformation. In this way, the protrusion portion 135 is moved along the guiding surface 122a and the elastic arm 133 produces the elastic deformation.

Then, when the latch 130 is moved to the second position P2, the protrusion portion 135 crosses over the guiding surface 122a of the position limiting unit 122, and now the position limiting unit 122 no longer leans against the protrusion portion 135, so that the elastic arm 133 is restored to its original state. It should be noticed that the electronic device 100 further includes a spring 150 connected between the latch 130 and the housing 110. When the latch 130 is moved from the first position P1 to the second position P2, the spring 150 is driven and stretched by the latch 130, so that when the latch 130 is moved to the second position P2, and the user stops pushing the latch 130, the elastic force of the spring 150 drives the latch 130 to move from the second position P2 to the first position P1. Now, the detachable member 120 is still not disassembled from the housing 110, and the protrusion portion 135 of the latch 130 leans against the limiting surface 122b of the position limiting unit 122, so that the detachable member 120 and the latch 130 are mutually interfered, and the latch 130 is position-limited at the second position P2.

In this way, a part of the detachable member 120 is lifted up from the housing 110 by the latch 130, though it does not fall off from the housing 110 due to the aforementioned interference, and the user can disassemble the detachable member 120 from the housing 110 by the single hand in case of the above interference, and then the spring 150 pulls back the latch 130 to the first position P1. In other words, after a buckling relation between the latch 130 and the detachable member 120 is released, a certain degree of interference there between is still maintained, so that the user is unnecessary to use both hands to operate the latch 130 and hold the detachable member 120. Comparatively, the mutual interference between the latch 130 and the detachable member 120 has a same effect as if the user holds the detachable member 120, which facilitates the user disassembling the detachable member 120 by the single hand. Therefore, the electronic device 100 may have better operability.

In summary, in the embodiment of the invention, in collaboration with the elastic unit of the latch and the position limiting unit of the detachable member, during the unlocking process, the latch only lifts a part of the detachable member away from the housing, and the detachable member and the latch are still in an interference state, which facilitates the user to fetch the detachable member by one hand, so as to improve utilization convenience of the electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device, comprising:
    a housing;
    a detachable member, assembled to the housing, and having a position limiting unit, wherein the position limiting unit has a guiding surface and a limiting surface; and
    a latch, movably disposed in the housing between a first position and a second position, wherein when the latch is located at the first position, the latch is engaged to the detachable member, and when the latch is located at the second position, the engagement between the latch and the detachable member is released, the latch has an elastic unit, and the position limiting unit is located on a moving path of the latch, and when the latch moves from the first position towards the second position, the elastic unit moves along the guiding surface to the limiting surface and is position-limited at the second position;
    wherein the housing has a track, and the latch comprises:
    a body;
    an elastic arm extending from the body; and
    a clamp portion, movably connected to the track; and
    a protrusion portion, disposed on the elastic arm and extending towards the detachable member, wherein the elastic arm and the protrusion portion form the elastic unit.

2. The electronic device as claimed in claim 1, wherein the guiding surface faces to the first position, and the limiting surface faces to the second position.

3. The electronic device as claimed in claim 1, wherein when the latch moves from the first position towards the second position, the guiding surface leans against the protrusion portion, so that the elastic arm produces an elastic deformation to drive the protrusion portion to move along the guiding surface.

4. The electronic device as claimed in claim 3, further comprising:
    a spring, connected between the latch and the housing, wherein when the latch is moved to the second position, the elastic arm is restored from the elastic deformation, and the spring drives the latch to move towards the first position such that the protrusion portion is interfered with the limiting surface.

5. The electronic device as claimed in claim 1, wherein the detachable member has an engaging portion, and the latch has a hook disposed on the body, and when the latch is located at the first position, the hook is buckled to the engaging portion to fix the detachable member to the housing.

6. The electronic device as claimed in claim 1, wherein the detachable member is a battery.

7. The electronic device as claimed in claim 1, wherein the detachable member is suitable for moving along a direction, and the direction is perpendicular to a moving direction of the latch.

8. The electronic device as claimed in claim 1, wherein the clamp portion is movably connected to the track for operating along a moving direction of the latch and another direction perpendicular to the moving direction.

* * * * *